United States Patent
Russell

(10) Patent No.: US 7,183,931 B1
(45) Date of Patent: Feb. 27, 2007

(54) PRESSURE-ACTUATED NOTIFICATION SYSTEM FOR FISHING LURES

(76) Inventor: Kirt K. Russell, 886 Saralyn Dr., Blackwell, OK (US) 74631

( * ) Notice: Subject to any disclaimer, the term of this patent is extended or adjusted under 35 U.S.C. 154(b) by 178 days.

(21) Appl. No.: 10/969,198

(22) Filed: Sep. 21, 2004

(51) Int. Cl.
G08B 23/00 (2006.01)
A01K 85/01 (2006.01)

(52) U.S. Cl. .............. 340/573.2; 340/539.11; 43/17; 43/4

(58) Field of Classification Search .......... 340/539.1
See application file for complete search history.

(56) References Cited

U.S. PATENT DOCUMENTS

| | | | | |
|---|---|---|---|---|
| 4,437,255 A | * | 3/1984 | Reed .................. | 340/668 |
| D302,810 S | | 8/1989 | Vickers et al. | |
| 4,928,419 A | * | 5/1990 | Forrestal ............. | 43/17 |
| 4,930,243 A | | 6/1990 | Lowe et al. | |
| 5,063,373 A | | 11/1991 | Lindsley | |
| 5,088,223 A | * | 2/1992 | Chu .................... | 43/17 |
| 5,396,726 A | * | 3/1995 | Zepeda, Sr. ......... | 43/17 |
| 5,581,930 A | * | 12/1996 | Langer ............... | 43/17 |
| 5,738,433 A | * | 4/1998 | Sparks ................ | 362/109 |
| 5,782,033 A | * | 7/1998 | Park et al. ........... | 43/4 |
| 5,867,931 A | * | 2/1999 | Morris et al. ........ | 43/17 |
| 5,894,691 A | * | 4/1999 | Zepeda, Sr. ......... | 43/17 |
| 6,253,483 B1 | | 7/2001 | Reams | |
| 6,487,812 B2 | * | 12/2002 | Johnson .............. | 43/17 |
| 6,568,121 B1 | * | 5/2003 | Gonzales ............ | 43/17 |
| 6,584,722 B1 | * | 7/2003 | Walls et al. ......... | 43/4 |
| 6,708,441 B2 | * | 3/2004 | Dirito ................. | 43/17 |
| 6,758,006 B1 | * | 7/2004 | Walls et al. ......... | 43/4.5 |
| 7,008,086 B1 | * | 3/2006 | Kell .................... | 362/431 |
| 2005/0166442 A1 | * | 8/2005 | Schiemann et al. .. | 43/17 |
| 2005/0193616 A1 | * | 9/2005 | Johnson .............. | 43/17 |

OTHER PUBLICATIONS

Title of Source: www.strikesensor.com Product Name: Strike Sensor Wireless Remote Strike Alert System.

* cited by examiner

Primary Examiner—Daniel Wu
Assistant Examiner—Eric M. Blount

(57) ABSTRACT

A wireless system for notifying a fisherman of a strike on a fishing line includes a non-corrosive housing defining a cavity therein and mountable to a fishing rod. The system includes a wireless signal mechanism including a transmitting section and a transportable receiving section. Such a transmitting section generates and sends a RF signal to the receiving section alerting the fisherman to a strike. The system further includes a bifurcated bracket including an upper section and a lower section. A plurality of fastening members are threadably engageable with the upper and lower sections for maintaining the housing at a substantially stable position above the rod.

15 Claims, 4 Drawing Sheets

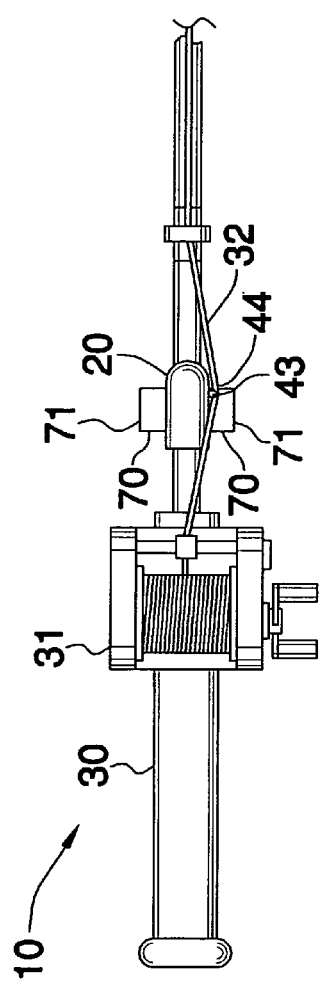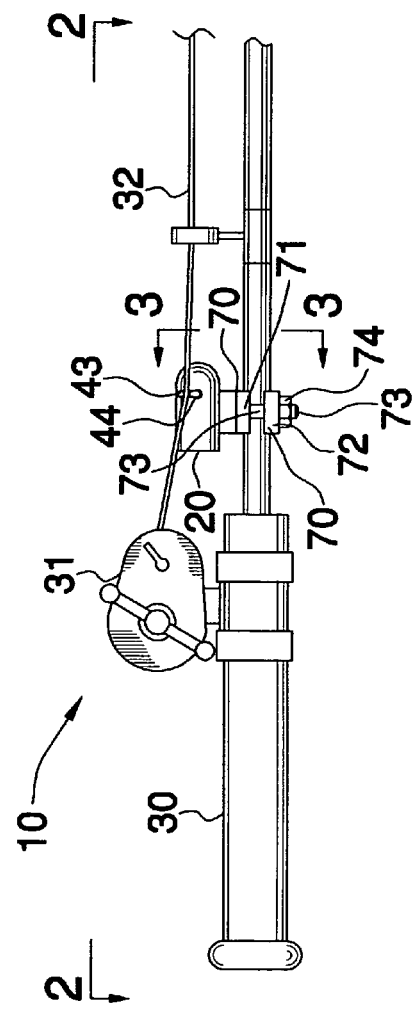

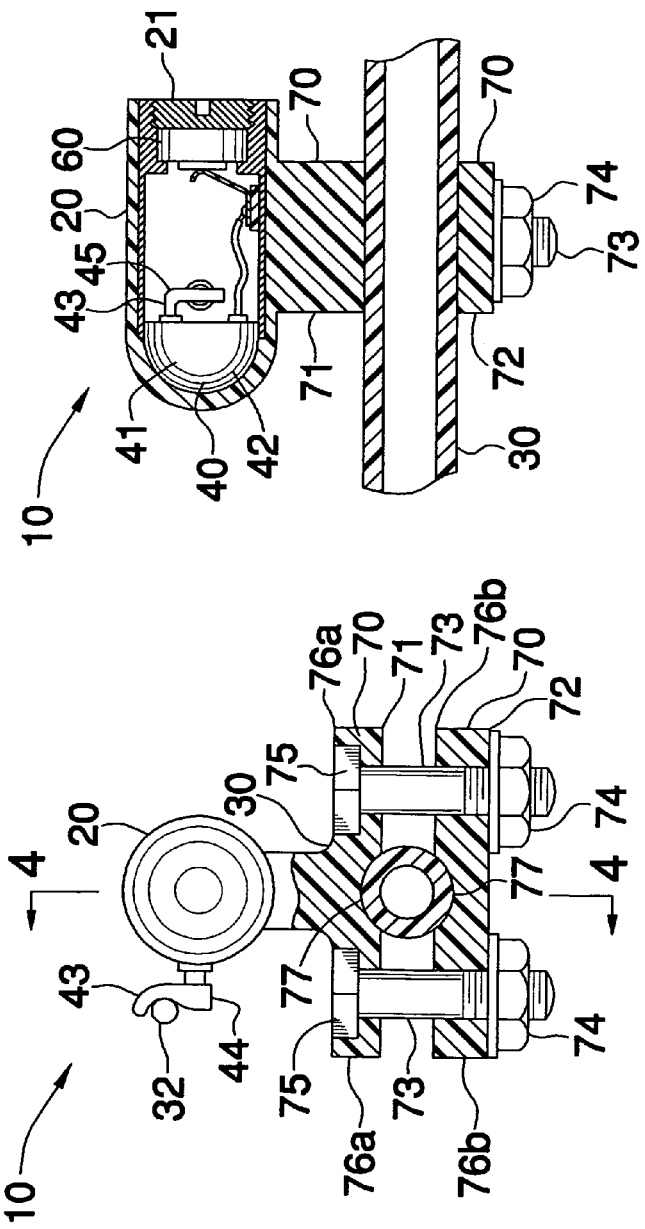

PRESSURE-ACTUATED NOTIFICATION SYSTEM FOR FISHING LURES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a notification system and, more particularly, to a pressure-actuated notification system for fishing lures.

2. Prior Art

Bite detectors are well known devices used to give an angler warning that a fish is taking the bait so that he is ready to set the hook at the desired time. The most common bite detectors used are simple devices that clip onto the tip of the fishing rod, such as bells and the like, which rattle when the tip of the rod is jerked suddenly by a biting fish.

The main drawback of these types of clip-on sounders is that they have to be fitted to the tip of the rod after every cast and removed again before an angler can strike at a biting fish. If the device is not removed before a strike then the device usually flies off the tip of the rod behind the angler and causes the line to tangle around the device, spelling disaster and mayhem for the angler. Having to remove the device each time before striking usually means that by the time the rod is lowered and the device is removed, the fish is long gone.

Another simple well known device used by anglers is a clip-on light which fits at the tip of the rod to allow the angler to see the tip when fishing in darkness. The main drawback of this device is that the tip of the rod must be constantly watched by the angler who must then try and determine which of the movements are bites and which are caused by other reasons, such as wind movement or tide pull. In most cases the device still has to be removed before striking can take place.

Accordingly, a need remains for a pressure-actuated notification system for fishing lures in order to overcome the above-noted shortcomings. The present invention satisfies such a need by providing a system that is easy to use, small in size, practical in nature and helps prevent fishermen from missing a fish strike. Such a system advantageously does not require removal from the rod prior to reeling in a fish and is sufficiently attached as to prevent the system from disengaging the rod during the fishing process.

BRIEF SUMMARY OF THE INVENTION

In view of the foregoing background, it is therefore an object of the present invention to provide a pressure-actuated notification system. These and other objects, features, and advantages of the invention are provided by a wireless system for notifying a fisherman of a strike on a fishing line.

The system includes a non-corrosive housing having a bullet shape and defining a cavity therein. Such housing is removably mountable to a fishing rod distally of an associated rod reel. The housing may include a removable cap threadably attachable thereto for allowing a user to selectively access the cavity. Such a housing has a centrally disposed longitudinal axis extending parallel to the rod and projecting upwardly therefrom along a substantially rectilinear plane wherein the housing is juxtaposed to a distal portion of the fishing line.

A wireless signal mechanism notifies the fisherman that a fish has pulled on the line. Such a notifying mechanism includes a transmitting section operably supported by the housing and a transportable receiving section for communicating with the transmitting section during operating conditions. The receiving section is positionable on a selected portion of the fisherman's body. The transmitting section generates and sends a real-time RF signal to the receiving section for advantageously alerting the fisherman.

The transmitting section preferably includes a transmitter stored within a distal end portion of the housing and a switch traversing through the housing. The switch includes a first lever extending outwardly of the housing and positioned along a selected path for intersecting and operably engaging the fishing line wherein the fishing line maintains the switch at a tensed position corresponding to a non-active mode. Such a switch further includes a second lever integrally attached to the first section and situated within the housing. The second lever moves in sync with the first lever and pivots along a predetermined arcuate path for selectively triggering the transmitter when the fishing line oscillates during biting conditions. Such a first lever moves towards a relaxed position corresponding to an active mode when biting conditions are initiated. A power supply source is electrically coupled to the transmitter and disposed within the housing.

The receiving section preferably includes a housing including an access panel removably secured thereto and a switch for manually toggling the system between active and inactive modes. A receiver is disposed within the housing wherein the actuator includes a vibrator operably connected to the receiver and a power supply source electrically coupled to the switch and the vibrator respectively. A clip is removably connected to the access panel so that the fisherman can conveniently attach the housing to a selected article of clothing.

The system further includes a bifurcated bracket including an upper section integral with the housing and extending downwardly therefrom and a lower section engageable about the rod at a fixed spatial distance from the upper section. Such a bracket further includes a plurality of fastening members threadably engageable with the upper and lower sections for conveniently maintaining the housing at a substantially stable position above the rod. The fastening members preferably include a plurality of hexagonal bolts that have head portions positioned flush with a top surface of the upper section and spaced apart from the fishing line so that the fishing line advantageously has a sufficient path along which to oscillate during operating conditions.

The upper section has a longitudinal axis extending substantially orthogonal to the rod and further has oppositely spaced flange portions situated along a horizontal plane. The lower section has a plurality of corresponding flange portions aligned subjacent to the first section flange portions and traversing the rod while maintaining a substantially equidistant spatial relationship with the upper section. Each such upper and lower sections are provided with respective arcuate depressions for effectively receiving the rod therealong.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a side elevational view showing a pressure-actuated notification system for fishing lures, in accordance with the present invention;

FIG. 2 is a top-plan view of the system shown in FIG. 1;

FIG. 3 is a cross-sectional view of the system shown in FIG. 1, taken along line 3—3;

FIG. 4 is a cross-sectional view of the system shown in FIG. 3, taken along line 4—4;

DETAILED DESCRIPTION OF THE INVENTION

Figure 5:
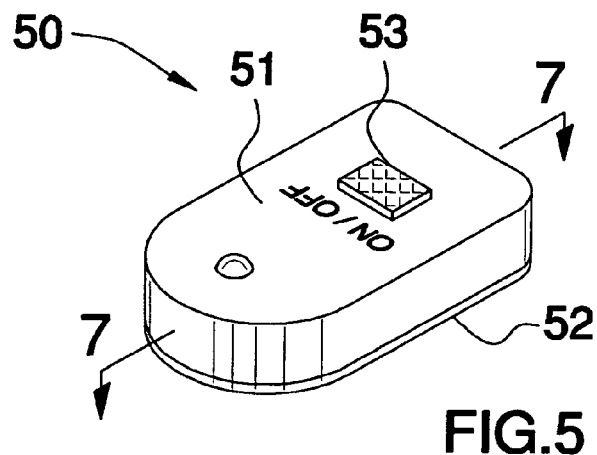
FIG. 5 is a perspective view of the receiving section.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1–7 by the reference numeral 10 and is intended to provide a pressure-actuated notification system for fishing lures. It should be understood that the system 10 may be used to notify many different types of movements and should not be limited to only the striking movement of a fish.

Referring initially to FIG. 1, the system 10 includes a non-corrosive housing 20 having a bullet shape and defining a cavity therein. Such a housing 20 is removably mountable to a fishing rod 30 distally of an associated rod reel 31. The placement of the system 10 at this position advantageously eliminates the need to remove same from the rod 30 upon each engagement of a fish with the rod 30, as is the case with conventional notifying systems. The housing 20 includes a removable cap 21 threadably attachable thereto for allowing a user to selectively access the cavity, as best shown in FIG. 4. Such a housing 20 has a centrally disposed longitudinal axis extending parallel to the rod 30 and projecting upwardly therefrom along a substantially rectilinear plane wherein the housing 20 is juxtaposed to a distal portion of the fishing line 32.

Referring to FIG. 4, a wireless signal mechanism 40 notifies the fisherman that a fish has pulled on the line 32, advantageously allowing the fisherman to set the hook (not shown) at the most opportune time. Such a notifying mechanism 40 includes a transmitting section 41 operably supported by the housing 20 and a transportable receiving section 50 for communicating with the transmitting section 41 during operating conditions. The receiving section 50 is positionable on a selected portion of the fisherman's body, conveniently allowing the fisherman freedom of movement about the rod 30 within the effective range of the transmitting 41 and receiving 50 sections, respectively. Thus, the fisherman can conveniently tend to other responsibilities or simply relax and have a good time, as is usually the intent when fishing. The transmitting section 41 generates and sends a real-time RF signal to the receiving section 50 for advantageously alerting the fisherman.

Still referring to FIG. 4, the transmitting section 41 includes a transmitter 42 stored within the distal end portion of the housing 20 and a switch 43 traversing through the housing 20. The switch 43 includes a first lever 44 extending outwardly of the housing 20 and positioned along a selected path for intersecting and operably engaging the fishing line 32 wherein the fishing line 32 maintains the switch 43 at a tensed position corresponding to a non-active mode. Such a switch 43 further includes a second lever 45 integrally attached to the first section 44 and situated within the housing 20. The second lever 45 moves in sync with the first lever 44 and pivots along a predetermined arcuate path for selectively triggering the transmitter 42 when the fishing line 32 oscillates during biting conditions. Such a first lever 44 moves towards a relaxed position corresponding to an active mode when biting conditions are initiated. A power supply source 60 is electrically coupled to the transmitter 42 and disposed within the housing 20.

Figure 6:
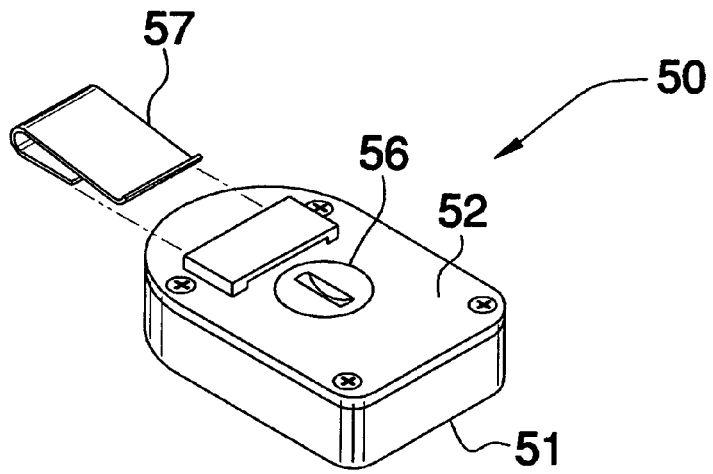
FIG. 6 is a rear perspective view of the receiving section shown in FIG. 5, showing the removable clip.
Figure 7:
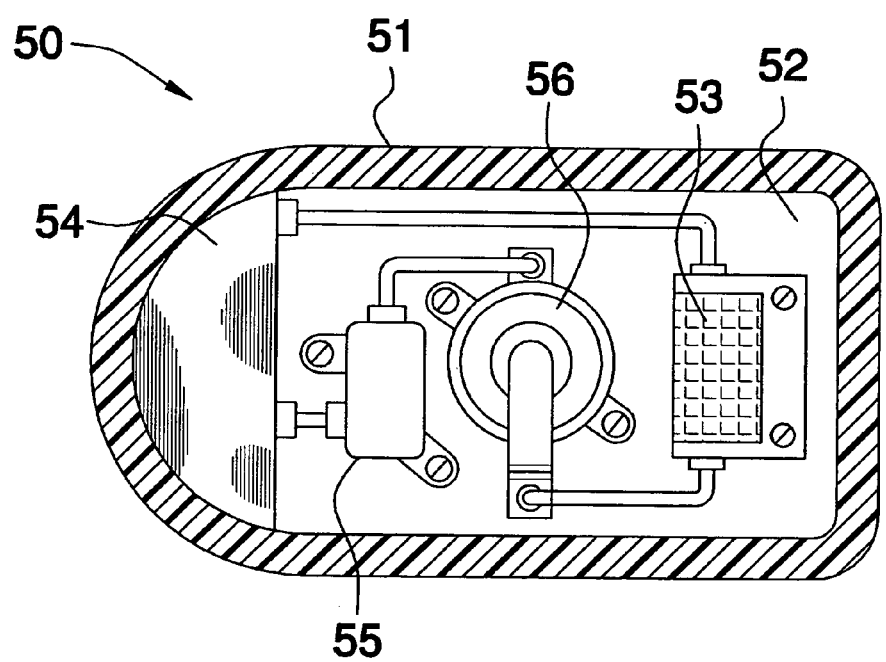
FIG. 7 is an enlarged cross-sectional view of the receiving section shown in FIG. 5, taken along line 7—7.

Referring to FIGS. 5–7, the receiving section 50 includes a housing 51 including an access panel 52 removably secured thereto and a switch 53 for manually toggling the system 10 between active and inactive modes. A receiver 54 is disposed within the housing 51 wherein the actuator includes a vibrator 55 operably connected to the receiver 54, and a power supply source 56 electrically coupled to the switch 53 and the vibrator 55 respectively, as best shown in FIG. 7. The vibrator 55 advantageously alerts the fisherman that a fish has engaged the line 32 without generating a noise that might frighten other fish away, as is often the case with conventional notifying systems. A clip 57 is removably connected to the access panel 52 so that the fisherman can conveniently attach the housing 51 to a selected article of clothing, as best shown in FIG. 6.

Referring to FIGS. 1, 3 and 4, the system 10 further includes a bifurcated bracket 70 including an upper section 71 integral with the housing 20 and extending downwardly therefrom, and a lower section 72 engageable about the rod 30 at a fixed spatial distance from the upper section 71. Such a bracket 70 further includes a plurality of fastening members 73 threadably engageable with the upper 71 and lower 72 sections for conveniently maintaining the housing 20 at a substantially stable position above the rod 30. The bracket 70 conveniently allows the system 10 to be transferred between a plurality of rods 30, eliminating the need to purchase multiple notifying systems 10.

The fastening members 73 include a plurality of hexagonal bolts 74 having head portions 75 positioned flush with a top surface of the upper section 71 and spaced apart from the fishing line 32 so that the fishing line 32 advantageously has a sufficient path along which to oscillate during operating conditions, as best shown in FIG. 3. This feature effectively prevents the line 32 from becoming entangled by the head portion 75, potentially leading to the breaking of the line 32 during operating conditions and resulting in the loss of a rewarding catch.

Still referring to FIG. 3, the upper section 71 has a longitudinal axis (not shown) extending substantially orthogonal to the rod and further has oppositely spaced flange portions 76a situated along a horizontal plane. The lower section 72 has a plurality of corresponding flange portions 76b aligned subjacent to the first section flange portions 76a and traversing the rod 30 while maintaining a substantially equidistant spatial relationship with the upper section 71. Each such upper 71 and lower 72 sections are provided with respective arcuate depressions 77 for effectively receiving the rod 30 therealong. Such arcuate depressions 77 advantageously prevent damage to the rod 30 when attaching the system 10.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A wireless system for notifying a fisherman of a strike on a fishing line, said system comprising:
    a housing defining a cavity therein and being removably mountable to a fishing rod distally of an associated rod reel, said housing having a centrally disposed longitudinal axis extending parallel to the rod and projecting upwardly therefrom along a substantially rectilinear plane;
    means for notifying the fisherman that a fish has pulled on the line, said notifying means comprising
        a transmitting section operably supported by said housing,
        a transportable receiving section for communicating with said transmitting section during operating conditions and positionable on a selected portion of the fisherman's body, wherein said transmitting section generates and sends a real-time RF signal to said receiving section for alerting the fisherman; and
    a bracket comprising
        an upper section integral with said housing and extending downwardly therefrom, and
        a lower section engageable about said rod at a fixed spatial distance from said upper section, said bracket further comprising a plurality of fastening members threadably engageable with said upper and lower sections for maintaining said housing at a substantially stable position above said rod;
    wherein said upper section has a longitudinal axis extending substantially orthogonal to the rod and further has oppositely spaced flange portions situated along a horizontal plane, said lower section having a plurality of corresponding flange portions aligned subjacent said first section flange portions and traversing said rod while maintaining a substantially equidistant spatial relationship with said upper section, each said upper and lower sections being provided with respective arcuate depressions for receiving said rod therealong.

2. The system of claim 1, wherein said transmitting section comprises:
    a transmitter stored within a distal end portion of said housing;
    a switch traversing through said housing and including a first lever extending outwardly of said housing and positioned along a selected path for intersecting and operably engaging the fishing line wherein said fishing line maintains said switch at a tensed position corresponding to a non-active mode, said switch further including a second lever integrally attached to said first section and situated within said housing, said second lever moving in sync with said first lever and pivoting along a predetermined arcuate path for selectively triggering said transmitter when the fishing line oscillates during biting conditions, said first lever moving towards a relaxed position corresponding to an active mode when biting conditions are initiated; and
    a power supply source electrically coupled to said transmitter and disposed within said housing.

3. The system of claim 1, wherein said fastening members comprise: a plurality of hexagonal bolts having head portions positioned flush with a top surface of said upper section and spaced apart from the fishing line so that the fishing line has a sufficient path along which to oscillate during operating conditions.

4. The system of claim 1, wherein said receiving section comprises:
    a housing including an access panel removably secured thereto;
    a switch for manually toggling said system between active and inactive modes;
    a receiver disposed within said housing wherein said actuator comprises a vibrator operably connected to said receiver;
    a power supply source electrically coupled to said switch and said vibrator respectively; and
    a clip removably connected to said access panel so that the fisherman can attach said housing to a selected article of clothing.

5. The system of claim 1, wherein said housing comprises: a removable cap threadably attachable thereto and for allowing a user to selectively access the cavity.

6. A wireless system for notifying a fisherman of a strike on a fishing line, said system comprising:
    a non-corrosive housing defining a cavity therein and being removably mountable to a fishing rod distally of an associated rod reel, said housing having a centrally disposed longitudinal axis extending parallel to the rod and projecting upwardly therefrom along a substantially rectilinear plane;
    wireless means for notifying the fisherman that a fish has pulled on the line, said notifying means comprising
        a transmitting section operably supported by said housing,
        a transportable receiving section for communicating with said transmitting section during operating conditions and positionable on a selected portion of the fisherman's body, wherein said transmitting section generates and sends a real-time RF signal to said receiving section for alerting the fisherman; and
    a bifurcated bracket comprising
        an upper section integral with said housing and extending downwardly therefrom, and
        a lower section engageable about said rod at a fixed spatial distance from said upper section, said bracket further comprising a plurality of fastening members threadably engageable with said upper and lower sections for maintaining said housing at a substantially stable position above said rod;

wherein said upper section has a longitudinal axis extending substantially orthogonal to the rod and further has oppositely spaced flange portions situated along a horizontal plane, said lower section having a plurality of corresponding flange portions aligned subjacent said first section flange portions and traversing said rod while maintaining a substantially equidistant spatial relationship with said upper section, each said upper and lower sections being provided with respective arcuate depressions for receiving said rod therealong.

7. The system of claim 6, wherein said transmitting section comprises:

a transmitter stored within a distal end portion of said housing;

a switch traversing through said housing and including a first lever extending outwardly of said housing and positioned along a selected path for intersecting and operably engaging the fishing line wherein said fishing line maintains said switch at a tensed position corresponding to a non-active mode, said switch further including a second lever integrally attached to said first section and situated within said housing, said second lever moving in sync with said first lever and pivoting along a predetermined arcuate path for selectively triggering said transmitter when the fishing line oscillates during biting conditions, said first lever moving towards a relaxed position corresponding to an active mode when biting conditions are initiated; and a power supply source electrically coupled to said transmitter and disposed within said housing.

8. The system of claim 6, wherein said fastening members comprise: a plurality of hexagonal bolts having head portions positioned flush with a top surface of said upper section and spaced apart from the fishing line so that the fishing line has a sufficient path along which to oscillate during operating conditions.

9. The system of claim 6, wherein said receiving section comprises:

a housing including an access panel removably secured thereto;

a switch for manually toggling said system between active and inactive modes;

a receiver disposed within said housing wherein said actuator comprises a vibrator operably connected to said receiver;

a power supply source electrically coupled to said switch and said vibrator respectively; and a clip removably connected to said access panel so that the fisherman can attach said housing to a selected article of clothing.

10. The system of claim 6, wherein said housing comprises: a removable cap threadably attachable thereto and for allowing a user to selectively access the cavity.

11. A wireless system for notifying a fisherman of a strike on a fishing line, said system comprising:

a non-corrosive housing having a bullet shape and defining a cavity therein, said housing being removably mountable to a fishing rod distally of an associated rod reel, said housing having a centrally disposed longitudinal axis extending parallel to the rod and projecting upwardly therefrom along a substantially rectilinear plane wherein said housing is juxtaposed to a distal portion of the fishing line;

wireless signal means for notifying the fisherman that a fish has pulled on the line, said notifying means comprising a transmitting section operably supported by said housing, a transportable receiving section for communicating with said transmitting section during operating conditions and positionable on a selected portion of the fisherman's body, wherein said transmitting section generates and sends a real-time RF signal to said receiving section for alerting the fisherman; and a bifurcated bracket comprising an upper section integral with said housing and extending downwardly therefrom, and a lower section engageable about said rod at a fixed spatial distance from said upper section, said bracket further comprising a plurality of fastening members threadably engageable with said upper and lower sections for maintaining said housing at a substantially stable position above said rod;

wherein said upper section has a longitudinal axis extending substantially orthogonal to the rod and further has oppositely spaced flange portions situated along a horizontal plane, said lower section having a plurality of corresponding flange portions aligned subjacent said first section flange portions and traversing said rod while maintaining a substantially equidistant spatial relationship with said upper section, each said upper and lower sections being provided with respective arcuate depressions for receiving said rod therealong.

12. The system of claim 11, wherein said transmitting section comprises:

a transmitter stored within a distal end portion of said housing;

a switch traversing through said housing and including a first lever extending outwardly of said housing and positioned along a selected path for intersecting and operably engaging the fishing line wherein said fishing line maintains said switch at a tensed position corresponding to a non-active mode, said switch further including a second lever integrally attached to said first section and situated within said housing, said second lever moving in sync with said first lever and pivoting along a predetermined arcuate path for selectively triggering said transmitter when the fishing line oscillates during biting conditions, said first lever moving towards a relaxed position corresponding to an active mode when biting conditions are initiated; and a power supply source electrically coupled to said transmitter and disposed within said housing.

13. The system of claim 12, wherein said fastening members comprise: a plurality of hexagonal bolts having head portions positioned flush with a top surface of said upper section and spaced apart from the fishing line so that the fishing line has a sufficient path along which to oscillate during operating conditions.

14. The system of claim 12, wherein said receiving section comprises:

a housing including an access panel removably secured thereto;

a switch for manually toggling said system between active and inactive modes;

a receiver disposed within said housing wherein said actuator comprises a vibrator operably connected to said receiver;

a power supply source electrically coupled to said switch and said vibrator respectively; and a clip removably connected to said access panel so that the fisherman can attach said housing to a selected article of clothing.

15. The system of claim 12, wherein said housing comprises: a removable cap threadably attachable thereto and for allowing a user to selectively access the cavity.

* * * * *